United States Patent

Van Kirk

[11] 4,053,404
[45] Oct. 11, 1977

[54] HEAT EXCHANGE METHOD FOR WET OXIDATION SYSTEMS

[75] Inventor: James W. Van Kirk, Stevensville, Mich.

[73] Assignee: Whirlpool Corporation, Benton Harbor, Mich.

[21] Appl. No.: 758,198

[22] Filed: Jan. 10, 1977

Related U.S. Application Data

[63] Continuation of Ser. No. 590,274, June 25, 1975, abandoned.

[51] Int. Cl.² .......................... C02B 1/34; C02B 3/08; C02B 1/02
[52] U.S. Cl. .................................... 210/63 R; 210/71
[58] Field of Search .............. 210/63 R, 71, 137, 175, 210/181, 152, 252, 258, 251

[56] References Cited

U.S. PATENT DOCUMENTS

| | | | |
|---|---|---|---|
| 2,903,425 | 9/1959 | Zimmermann | 210/63 |
| 3,272,740 | 9/1966 | Gitchel et al. | 210/181 |
| 3,464,917 | 9/1969 | Porteous | 210/181 |
| 3,647,687 | 3/1972 | Matthiesen | 210/181 |
| 3,716,474 | 2/1973 | Hess | 210/71 |
| 3,808,126 | 4/1974 | Pradt | 210/63 |
| 3,844,948 | 10/1974 | Burke et al. | 210/181 |
| 3,853,759 | 12/1974 | Titmus | 210/63 |
| 3,856,672 | 12/1974 | Boswinkle et al. | 210/63 |
| 3,876,536 | 4/1975 | Pradt et al. | 210/63 |
| 3,929,639 | 12/1975 | Turner | 210/181 |

Primary Examiner—Wilbur L. Bascomb, Jr.
Assistant Examiner—Ernest G. Therkorn
Attorney, Agent, or Firm—Hill, Gross, Simpson, Van Santen, Steadman, Chiara & Simpson

[57] ABSTRACT

Heat exchange means and method for a continuous wet oxidation apparatus for treating organic waste sewage employing a reactor within which the sewage is treated in the presence of heat, includes handling the influent by means providing a continuous hydraulic circuit for the passage of waste sewage to the reactor, such influent means comprising in series a holding tank communicating downstream with a high pressure pump acting to drive the influent through a low pressure heat exchanger a high pressure heat exchanger and then through an inlet into the reactor, and means for handling effluent from the reactor providing a continuous hydraulic circuit for the passage of treated liquid from the reactor and having in series an outlet and passage from the reactor to conduct hot effluent through the high pressure heat exchanger from which the passage leads to a throttling device and thence to and through the low pressure heat exchanger to a second throttling device and therefrom to a disposal point. The influent waste sewage conducted from the holding tank to the reactor is preheated by heat from the effluent liquid in two stages, comprising a first stage at low pressure and a second stage at high pressure.

2 Claims, 2 Drawing Figures

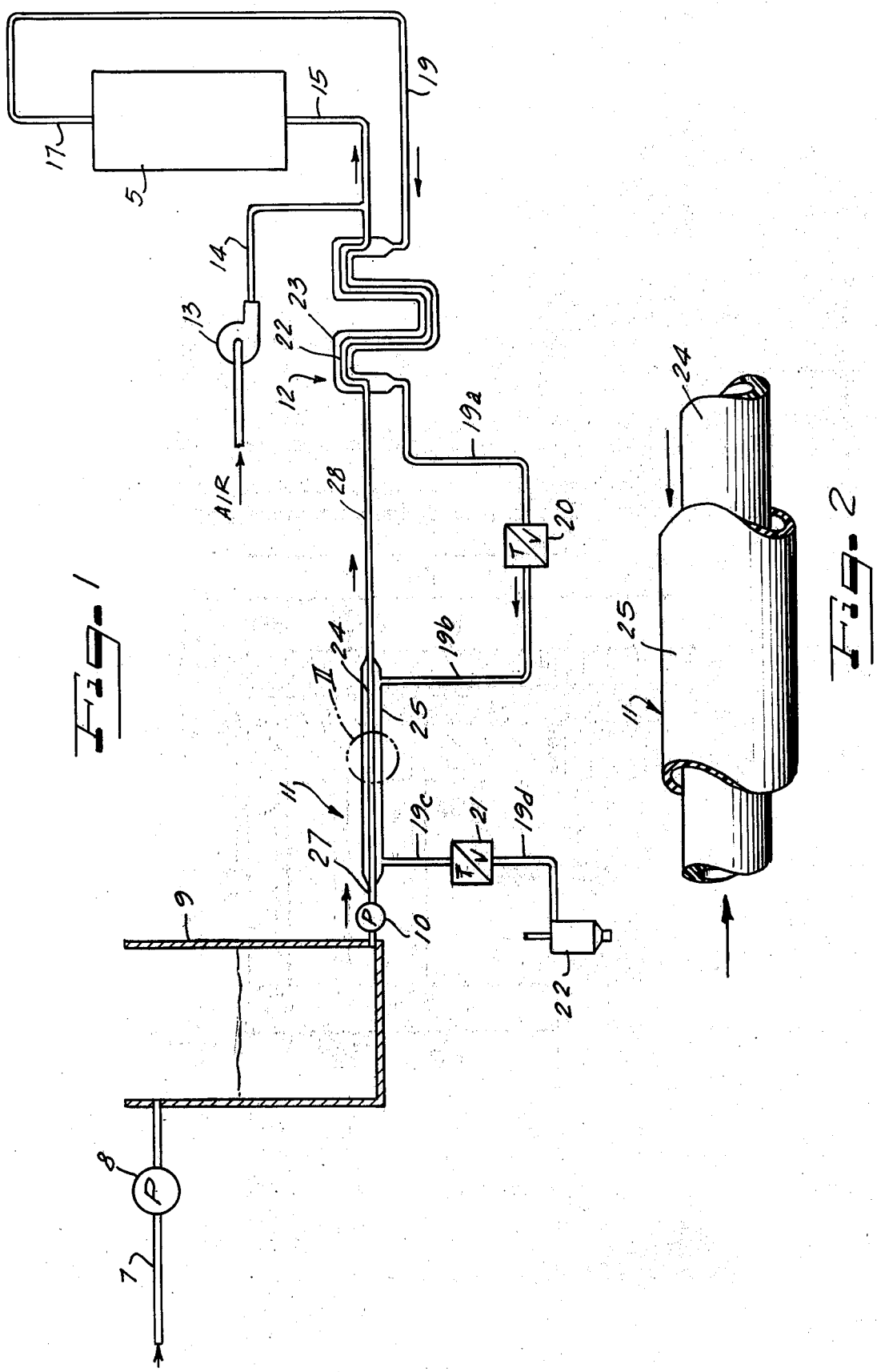

HEAT EXCHANGE METHOD FOR WET OXIDATION SYSTEMS

This is a continuation of application Ser. No .590,274, filed June 25, 1975, now abandoned.

BACKGROUND OF THE INVENTION

1. Field of the Invention

This invention relates generally to waste disposal, and is more particularly concerned with inprovements in treating organic waste sewage by the wet oxidation porcess.

2. Prior Art

Wet oxidation systems for handling the disposal of industrial and municipal wastes, as well as for handling waste, organic trash and garbage which is generated in normal residential habitation are known. The general process of wet oxidation is based on the prior art knowledge that any substance capable of burning can be oxidized in the presence of liquid water at increased temperatures, for example in excess of 250° F (121° C). Examples of prior industrial and municipal waste disposal systems employing the wet oxidation process can be found in U.S. Pats. Nos. 2,903,425; 3,272,740 and 3,464,917. By way of example of a continuous wet oxidation system especially suitable for residential uses reference is made to Boswinkle and Wheaton U.S. Pat. No. 3,856,672, issued Dec. 24, 1974 and assigned to the same assignee as the present application.

SUMMARY OF THE INVENTION

A deficiency in prior systems has been the inefficient use of residual heat in the effluent from the reactor. According to the present invention a heat exchanger arrangement is provided for the wet oxidation system which improves the efficiency of the system at low cost. Accordingly, waste, organic trash flushed through a sewage system and macerated and mixed to form a liquid influent which can be circulated through a hydraulic circuit is directed to a reactor within which the sewage is treated in the presence of heat to effect wet oxidation. Influent handling means provide a continuous hydraulic circuit for the passange of waste sewage as influent to the reactor, and include in series, a holding tank communicating downstream with a high pressure pump acting to drive the influent successively through a low pressure heat exchanger, a high pressure heat exchanger and then through an inlet into the reactor. From the reactor effluent is handled by means providing a continuous hydraulic circuit for the passage of treated liquid and including in series an outlet and passage from the reactor to conduct hot effluent through the high pressure heat exchanger from which the passage leads to a throttling device and thence to and through the low pressure heat exchanger to a second throttling device and then to a disposal point where the effluent may be separated into harmless gases vented to atmosphere, a small amount of sterile ash and a clarified supply of reusable water.

According to the present invention, therefore, the influent waste sewage in traveling from the holding tank to the reactor is preheated by heat from the effluent liquid in two stages, comprising a first stage at low pressure and a second stage at high pressure, thus efficiently utilizing the residual heat derived from the effluent.

BRIEF DESCRIPTION OF THE DRAWING

FIG. 1 is a schematic illustration of a continuous wet oxidation apparatus embodying features of the invention; and FIG. 2 is an enlarged fragmentary elevational detail view of the low pressure heat exchanger, and taken substantially within the circle II is FIG. 1.

DESCRIPTION OF THE PREFERRED EMBODIMENT

By way of example, the present invention is illustrated in FIG. 1 and is described in conjunction with a continuous wet oxidation apparatus which is especially suitable for residential sewage disposal systems. At the heart of such a system is a reactor 5 within which organic waste sewage is treated in the presence of heat. For example, the reactor 5 may be of the type disclosed in the aforesaid Boswinkle and Wheaton U.S. Pat. No. 3,856,672, wherein the influent is confined in a stream together with air supplied thereto to flow through a heat transfer coil of substantial length in a reacting zone while adding electrical thermal energy to the stream throughout the entire effective flow path length of the coil within the reacting zone such that a temperature in the order of 550° – 560° F (288° – 294° C) is maintained throughout travel of the stream through the coil in the reacting zone, thereby oxidizing the solids during residence of the stream in the reacting zone and forming a completely oxidized effluent within the reacting zone.

Influent is handled by means providing a continuous hydraulic circuit for the passage of waste sewage as influent to the reactor 5. For this purpose, the influent means includes a drain line 7, a grinder pump 8 which macerates and delivers the influent to a holding tank 9 communicating downstream with a high pressure pump 10 acting to drive the influent through a two stage preheating system comrpising a first, low pressure heat exchanger 11 and downstream therefrom a second, high pressure heat exchanger 12, and then into the reactor 5.

The pump 10 may be of a size and a capacity to pump the influent through the system at in the order of eleven gallons per hour at a system pressure range in the order of 1500 to 1600 psi. For sufficient oxygen to sustain the wet oxidation process, air may be provided from a suitable source such as a compressor 13 from which the air is delivered through an air duct 14 into an inlet 15 of the reactor 5 after the influent leaves the high pressure heat exchanger 12.

For passage of treated liquid or effluent from the reactor 5, effluent handling means providing a continuous hydraulic circuit include, in series, an outlet 17 and a conduit 19 providing passage from the reactor to conduct hot effluent therefrom to circulate still at high pump pressure into an inlet end of, and through the high pressure heat exchanger 12. Thence, an outlet passage conduit 19a leads to a throttling device 20 from which a passage condiut 19b leads to an inlet end of the low pressure heat exchanger 11 for circulation of the effluent therethrough at relatively low pressure. The effluent leaves the exchanger 11 through an outlet conduit 19c and passes through a second throttling device 21 and then through a discharge conduit 19d to a disposal point such as a liquid, gas, ash separator device 22.

Downstream from the throttling device 20 the effluent line pressure is greatly reduced from the pressure upstream from the throttling device. For example, where the effluent line pressure and temperature upstream from the throttling device 20 may be in the order of 1500 to 1600 psi and up to 560° F, respectively, the line pressure and temperature downstream from the throttling device 20 may be in the order of 500 psi and 400° F, respectively, or less, depending on the overall system design. Function of the throttling device 21 is to control the effluent line pressure upstream therefrom to be no greater than in the order of 500 psi in the first heat exchanger 11.

By way of example, the heat exchanger 12 may be of the efficient tube-in-tube type wherein the influent flows through an inner heat exchange tube section 22 and the effluent flows counter-current through an outer heat exchange tube 23 of larger inside diameter than the outside diameter of the tube section 22. The outer tube 23 surrounds the inner tube section 22 in spaced relation and is connected at its inlet end to the conduit 19 and at its outlet end to the conduit 19a. Thereby, the influent is efficiently heated by the effluent, and the effluent is correspondingly cooled by the heat exchange thus effected.

It is difficult and expensive to attain utmost efficiency in the high pressure heat exchanger 12. Highest efficiency would be attained where the cold end temperature differential between the influent in the heat exchanger and the effluent in the heat exchanger could be kept to a bare minimum. This would require a very large heat exchanger unit. Because the heat exchanger 12 is subject to high pressure from both the influent and effluent, it must be constructed according to boiler codes requiring costly materials such as stainless steel. Therefore, in order to economize on space and equipment costs, it has been the practice to sacrifice efficiency by increasing the differential between the cold end influent and effluent temperature in the heat exchanger.

However, according to the present invention, the primary, high pressure heat exchanger 12, which has to be constructed according to boiler codes and therefore with relatively costly materials such as stainless steel, can be reduced in length, thereby effecting substantial equipment economies. This is accomplished by sending the effluent through the secondary or low pressure heat exchanger 11 downstream from the throttling device 20. Thereby, the temperature differential between the effluent and influent is effectively further reduced for improved operating efficiency such that the combined temperature differential reduction attained in the low pressure heat exchanger 11 and in the high pressure heat exchanger 12 is the optimum for highest efficiency of the system.

Because the temperature differential between the influent and effluent has been substantially lowered in the second or primary heat exchanger 12, and the first or secondary heat exchanger 11 operates under substantially lower temperature and lower pressure of the effluent after leaving the throttling device 20, the design requirements for the heat exchanger 11 are relatively simple. In an efficient, low cost construction, the low pressure secondary heat exchanger 11 can be constructed as a tube-in-tube unit as exemplified in FIG. 1 and shown in larger detail in FIG. 2, with only an inner tube section 24 being constructed of thick walled expensive material. Inasmuch as the effluent is predominantly liquid water because the sewage particles have been oxidized, the effluent, now at relatively low pressure, can pass through the heat exchanger 11 in a relatively narrow annulus between the inner tube secion 24 and an outer tube 25 with which the conduits 19b and 19c communicate. On the other hand, the raw sewage influent is conducted through the inner tube section 24 which together with connected influent duct 27 leading from pump 10 is of sufficiently large inside diameter to prevent fouling. A similar size duct 28 connects the low pressure exchanger inner tube section 24 with the high pressure exchanger inner tube 22.

Because of the relatively lower pressure and lower heat in the secondary heat exchanger 11, the outer tube section 25, at least, can be made from a relatively low grade material, such as a synthetic plastic material, e.g. polypropelene, nylon, and the like, depending on the design pressures and temperatures. As a result of the low cost, economical construction of the low pressure heat exchanger 11, and the smaller economical construction permitted for the high pressure heat exchanger 12, a system combining the use of the low pressure heat exchanger 11 and the high pressure heat exchanger 12, can achieve substantially improved, smaller temperature differential and improved total efficiency within a total heat exchanger cost no greater than where a high pressure heat exchanger alone is used in a wet oxidation system of the type considered herein.

Although various minor modifications might be suggested by those versed in the art, it should be understood that I wish to embody within the scope of the patent warranted hereon all such modifications as reasonably and properly come within the scope of my contribution to the art.

Having described the invention, the embodiments of the invention in which an exclusive property or privilege is claimed are defined as follows:

1. A method of treating organic waste sewage by continuous wet oxidation process, the method comprising:

treating the sewage in the presence of heat at a temperature of about 550°-560° F in a reactor; passing waste sewage as influent to said reactor from a pump in series through a first heat exchanger and downstream from said first heat exchanger through a second heat exchanger and then through an inlet into said reactor;

conducting treated liquid from said reactor as hot effluent through said second heat exchanger and then through a throttling device and thence to and through said first heat exchanger and from the first heat exchanger to a disposal point;

maintaining pressure of the effluent upstream from the throttling device and thereby the pressure in said second heat exchanger at about 1500 to 1600 psi and temperature of about 560° F; and controlling the pressure downstream from the throttling device and in said first heat exchanger to be no greater than about 500 psi and temperature up to 400° F;

whereby the influent waste sewage in travelling from said pump to said reactor is preheated by heat from the effluent liquid in two stages, comprising a first stage in said frist heat exchanger and in which said effluent is at a lower pressure and temperature than in a second stage in said second heat exchanger in which said effluent is at higher pressure and temperature than the pressure and temperature in said first heat exchanger.

2. A method according to claim 1, comprising effecting travel of the influent in heat exchanging relation to the effluent in the first heat exchanger by running the effluent through an outer pipe and running the influent through an inner section which is of smaller outside diameter than the inside diameter of the outer pipe and is within the inner pipe and extends therealong.

* * * * *